US008924031B1

(12) United States Patent
Evett et al.

(10) Patent No.: US 8,924,031 B1
(45) Date of Patent: Dec. 30, 2014

(54) IRRIGATION SCHEDULING AND SUPERVISORY CONTROL AND DATA ACQUISITION SYSTEM FOR MOVING AND STATIC IRRIGATION SYSTEMS

(75) Inventors: Steven R. Evett, Amarillo, TX (US); Susan A. O'Shaughnessy, Amarillo, TX (US); Robert Troy Peters, Prosser, WA (US)

(73) Assignee: The United States of America, as represented by the Secretary of Agriculture, Washington, DC (US)

( * ) Notice: Subject to any disclaimer, the term of this patent is extended or adjusted under 35 U.S.C. 154(b) by 451 days.

(21) Appl. No.: 13/403,091

(22) Filed: Feb. 23, 2012

Related U.S. Application Data

(60) Provisional application No. 61/513,767, filed on Aug. 1, 2011.

(51) Int. Cl.
*G05D 11/00* (2006.01)

(52) U.S. Cl.
USPC ............................................ 700/284; 239/69

(58) Field of Classification Search
USPC .................. 700/284; 239/67, 69, 70; 702/130
See application file for complete search history.

(56) References Cited

U.S. PATENT DOCUMENTS

| | | | | |
|---|---|---|---|---|
| 4,755,942 A * | 7/1988 | Gardner et al. | ............... | 700/284 |
| 4,876,647 A * | 10/1989 | Gardner et al. | ............... | 700/284 |
| 5,539,637 A * | 7/1996 | Upchurch et al. | ............ | 700/284 |
| 5,764,819 A * | 6/1998 | Orr et al. | ........................ | 382/110 |
| 6,069,112 A * | 5/2000 | Glenn et al. | .................. | 504/119 |
| 6,597,991 B1 * | 7/2003 | Meron et al. | ...................... | 702/3 |
| 7,280,892 B2 * | 10/2007 | Bavel | ............................. | 700/284 |
| 2009/0192038 A1 * | 7/2009 | Hoobler et al. | ............ | 504/116.1 |
| 2009/0277506 A1 | 11/2009 | Bradbury et al. | | |
| 2010/0032493 A1 * | 2/2010 | Abts et al. | ........................ | 239/11 |
| 2010/0032495 A1 * | 2/2010 | Abts | ............................... | 239/69 |
| 2010/0144524 A1 * | 6/2010 | Hoobler et al. | ............ | 504/116.1 |

OTHER PUBLICATIONS

Jackson, Ray D., et al., "A Reexamination of the Crop Water Stress Index", Irrigation Science, 1988, 9, pp. 309-317.
Peters, D. Troy, et al., "Modeling Diurnal Canopy Temperature Dynamics Using One-Time-of-Day Measurements and a Reference Temperature Curve", Agronomy Journal, vol. 96, Nov.-Dec. 2004, pp. 1553-1561.
O'Shaughnessy, Susan A., et al., "Soil Water Measurement and Thermal Indices for Center Pivot Irrigation Scheduling" presented at Proc. Irrigation Assoc. Show, 2008.

(Continued)

*Primary Examiner* — Charles Kasenge
(74) *Attorney, Agent, or Firm* — Robert D. Jones; John D. Fado; Lesley Shaw

(57) ABSTRACT

Irrigation of plants or crops is effected using plant canopy temperature measurements. The process and device include an irrigation scheduling algorithm based on an integrated water stress index (WSI) and an integrated WSI set-point. A WSI is calculated at repeated time intervals and compared to an encoded threshold WSI value that is crop and region specific. If the calculated WSI is greater than the encoded WSI value, a unit of integrated WSI (IWSI) is accumulated. If the time integral exceeds the encoded value for a 24 hour period, an irrigation signal is produced, directing the irrigation system where, when and how much to irrigate. The process and device will automatically schedule crop irrigations when the crop is water stressed and may control a moving or static irrigation system to apply the irrigation. Moreover, irrigation applications can be selectively varied over specified control areas or management zones.

19 Claims, 1 Drawing Sheet

(56) References Cited

OTHER PUBLICATIONS

O'Shaughnessy, Susan A., et al., "Automatic Irrigation Scheduling of Grain Sorghum Using a CWSI and Time Threshold", An ASABE Conference Presentation, Paper No. IRR10-9011, written for presentation at the 5th National Decennial Irrigation Conference, Phoenix, AZ on Dec. 5-8, 2010.

O'Shaughnessy, Susan A., et al., "Integration of Wireless Sensor Networks into Moving Irrigation Systems for Automatic Irrigation Scheduling", An ASABE Meeting Presentation, Paper No. 083452, written for presentation at the 2008 ASABE Annual Meeting on Jun. 29-Jul. 2, 2008, Providence, RI.

Peters, R. T., et al., "Spatial and Temporal Analysis of Crop Conditions Using Multiple Canopy Temperature Maps Created With Center-Pivot-Mounted Infrared Thermometers", Transactions of the ASABE, 2007, vol. 50 (3), pp. 919-927.

Hunsaker, Douglas J., et al., "Estimating cotton evapotranspiration crop coefficients with a multispectral vegetation index", Irrigation Science, 2003, 22, pp. 95-104.

Hunsaker, D. J., et al., "Cotton Irrigation Scheduling Using Remotely Sensed and FAO-56 Basal Crop Coefficients", Transactions of the ASAE, 2005, vol. 48, 4, pp. 1395-1407.

Peters, R. Troy, et al., "Automation of a Center Pivot Using the Temperature-Time-Threshold Method of Irrigation Scheduling", Journal of Irrigation and Drainage Engineering, May/Jun. 2008, pp. 286-291.

Evett, Steven R., et al., "Controlling Water Use Efficiency with Irrigation Automation: Cases from Drip and Center Pivot Irrigation of Corn and Soybean", Southern Conservation Systems Conference, Amarillo, TX Jun. 26-28, 2006, pp. 57-66.

\* cited by examiner

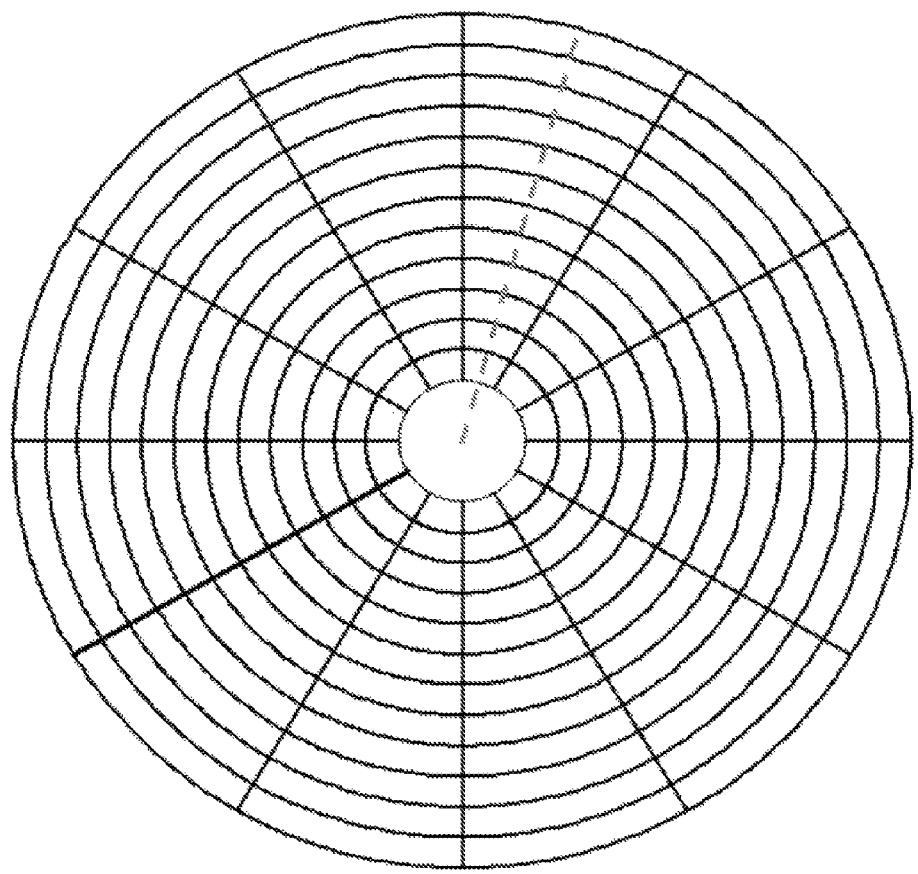

IRRIGATION SCHEDULING AND SUPERVISORY CONTROL AND DATA ACQUISITION SYSTEM FOR MOVING AND STATIC IRRIGATION SYSTEMS

This application claims the benefit under 35 U.S.C. 1.19(e) of U.S. provisional No. 61/513,767, filed Aug. 1, 2011, the contents of which are incorporated by reference herein.

BACKGROUND OF THE INVENTION

1. Field of the Invention

The invention is drawn to a method and apparatus for managing the irrigation of plants.

2. Description of the Prior Art

Automatic irrigation scheduling triggered by canopy temperature and time thresholds has been successful in trials for corn, cotton and soybean (Evett et al. 2006. Controlling water use efficiency with irrigation automation: Cases from drip and center pivot irrigation of corn and soybean. pp. 57-66 In *Proc. 28th Annual Southern Conservation Systems Conference*, Amarillo Tex., Jun. 26-28, 2006; Peters and Evett. 2008. Automation of a center pivot using the temperature-time-threshold method of irrigation scheduling. *J. Irrig. Drainage Engr.* 134 (3): 286-290). Key attributes of such automatic irrigation scheduling are the control of crop water stress and water use efficiency by delivering irrigations only when required and by applying the necessary amount of water without compromising yield or quality.

The crop water stress index, CWSI, has been related to leaf water potential (Howell et al. 1984. Evaluation of Cotton Canopy Temperature to detect crop water stress. *Trans. ASAE* 27(1): 84-88; Ben-Asher et al. 1992 Canopy temperature to assess daily evapotranspiration and management of high frequency drip irrigation systems. *Agric. Water Manage.* 22(4): 379-390; Jackson. 1991. Relationships between normalized leaf water potential and crop water stress index values for acala cotton. *Agric. Water Manage.* 19(2): 135-149; Oliva et al. 1994. White clover seed production: I. Crop water requirements and irrigation timing. *Crop Science* 34(3): 762-767; Cohen et al. 2005. Estimation of leaf water potential by thermal imagery and spatial analysis. *J. Exp. Botany* 56(417): 1843-1852), linked to soil water content (Idso and Reginato. 1982. Soil- and atmosphere-induced plant water stress in cotton as inferred from foliage temperatures. *Water Resources* 18(4): 1143-1148; Colaizzi et al. 2003. Estimating soil moisture under low-frequency surface irrigation using Crop Water Stress Index. *ASCE J. Irrigation and Drainage Engr.* 129(1): 27-35), used to characterize crop water stress (Idso et al. 1981. Normalizing the stress degree day for environmental variability. *Agric. Meteorol.* 24: 45-55; Allen and Nakayama. 1988. Relationship between crop water stress index and other physiological plant water status indicators in guayule. *Field Crops Research* 18(4): 287-296; Yazar et al. 1999. Evaluation of crop water stress index for LEPA irrigated corn. *Irrig. Sci.* 18(4): 171-180; Yuan et al. 2004. Evaluation of a crop water stress index for detecting water stress in winter wheat in the North China Plain. *Agric. Water Manage.* 64(1): 29-40; Moeller et al. 2007. Use of thermal and visible imagery for estimating crop water status of irrigated grapevine. *J. of Exp. Botany* 58(4): 827-838), and evaluated as a tool for irrigation timing (Throssel et al. 1987. Canopy temperature based irrigation scheduling indices for Kentucky Bluegrass turf. *Crop Science* 27(1): 126-131; Nielsen. 1990. Scheduling irrigations for soybeans with the Crop Water Stress Index. *Field Crop Research* 23(2): 103-116; Garrot et al. 1994. Quantifying wheat water stress with the crop water stress index to schedule irrigations. *Agron. J.* 86(1): 195-199; Gontia and Tiwari. 2008. Development of crop water stress index of wheat crop for scheduling irrigation using infrared thermometry. *Agric. Water Manage.* 95(10): 1144-1152). This thermal based index provides a relative measure of plant stress which can be derived from radiant leaf temperatures and ambient meteorological parameters (Pinter et al. 1983. Infrared thermometry: A remote sensing technique for predicting yield in water-stressed cotton. *Agric. Water Manage.* 6(4): 385-395). The theoretical CWSI developed by Jackson et al. (1981. Canopy temperature as a crop water stress indicator. *Water Resources Research* 17: 1133-1138) incorporated incoming solar radiation, relative humidity, air temperature, wind speed, canopy resistance at potential evapotranspiration, and crop height. Its general form is given as:

$$CWSI = \frac{(T_c - T_a) - (T_c - T_a)_{ll}}{(T_c - T_a)_{ul} - (T_c - T_a)_{ll}}$$

where $T_c$ is crop canopy temperature, $T_a$ is air temperature, $(T_c-T_a)_{ll}$ is the lower limit representing the temperature difference for a well watered crop, $(T_c-T_a)_{ul}$ is the upper limit representing the temperature difference between the crop canopy and ambient air when the plants are severely stressed (Jackson et al. 1988. A reexamination of the crop water stress index. *Irrig Sci.* 9: 309-317). The CWSI tends towards 0 after irrigations and progressively increases towards 1 as soil water is being depleted.

However, despite these and other advances, the need remains for improved methods for controlling irrigation, particularly for plants grown under low rainfall and semi-arid conditions.

SUMMARY OF THE INVENTION

We have now invented a novel process and device for managing the irrigation of plants or crops using plant canopy temperature measurements. The process and device will automatically schedule crop irrigations when the crop is water stressed and may control a moving (i.e., field traversing) or static irrigation system to apply the irrigation. Moreover, irrigation applications can be selectively varied by specified control areas or management zones. The signal for irrigations is based on real-time, near-surface remote crop canopy temperature monitoring and access to microclimatological data. Process set points can be manipulated to provide for regulated deficit irrigation that provides for increased water use efficiency while reducing risk of yield failure commonly associated with other methods of deficit irrigation. In addition, this invention provides field mapping of crop water stress levels, out-of-control areas needing special attention and relative potential yield.

The process and device include a novel irrigation scheduling algorithm based on a cumulative water stress index (WSI) and an integrated WSI set-point. The water stress index being an indication of crop water status. In brief, a WSI calculated at repeated time intervals is compared to an encoded threshold WSI value that is crop and region specific. If the calculated WSI is greater than the encoded WSI value, a unit of integrated WSI (IWSI) is accumulated. If the time integral (IWSI) exceeds the encoded value for a 24 hour period, an irrigation signal is produced, directing the irrigation system (e.g., center pivot) where, when and how much to irrigate.

Alternatively, the irrigation signal may direct the grower or an operator of the irrigation system to actuate this irrigation.

The overall process for managing irrigation in accordance with this invention includes the steps of:
- a) mapping (or subdividing) a larger geographical area or agricultural field subject to irrigation into two or more target control areas or management zones to be irrigated by the irrigation system;
- b) determining the diel progression of the plant canopy temperature change, $T_s$, for each of the control areas comprising:
  1) measuring and recording the predawn canopy temperature, $T_e$, of plants in a nearby reference area (i.e., in the vicinity of the control areas);
  2) measuring and recording the mean canopy temperature, $T_{rmt,t}$, of plants in each of the control areas over a time interval, $\tau$, during a daylight time, $t+n\tau$, where n is an integer greater than or equal to 0;
  3) measuring and recording, or calculating from iterative solution of the surface energy balance based on weather data, over each time interval, $\tau$, during the course of the day, a mean reference canopy temperature, $T_{ref}$, for plants of the same species, cultivar or line, grown under well-watered conditions in one or more reference areas in the vicinity of (including within) the geographical area, thereby providing a plurality of $T_{ref}$ measurements, at least one at each time, $t+n\tau$. This constitutes a diel series of reference surface temperature values. The value of $T_{ref}$ which is measured at the time t which is coincident with the time (i.e., at the same time $t+n\tau$) that $T_{rmt,t}$ is measured for a given control area, is $T_{ref,t}$; and
  4) determining the diel progression of the canopy temperature values, $T_s$, for each of the control areas at each time, $t+n\tau$, (i.e., over each time interval) thereby providing a plurality of $T_s$ measurements for each area, one for each time that $T_{ref}$ was measured;
- c) determining a water stress index value, WSI, for each of the control areas at each time, $t+n\tau$ (i.e., over each time interval), thereby providing a plurality of WSI measurements for each area, one for each time that $T_{ref}$ was measured;
- d) comparing each of the WSI values for each control area to a threshold water stress index value, $WSI_{e\_psp}$, wherein said $WSI_{e\_psp}$ is specific for said plant in said geographic area, and
  1) for each WSI for a given control area which is greater than or equal to $WSI_{e\_psp}$, adding a unit (which may be an increment of WSI or a difference thereof) to a WSI register to provide an integrated WSI, $WSI_{e\_i}$, for each control area;
- e) comparing the $WSI_{e\_i}$ for each control area to an encoded set-point value, $WSI_{e\_ip}$, for a predetermined time period (usually approximately 24 hours), and generating a signal for irrigation, or automatically initiating irrigation, of any control area wherein $WSI_{e\_i}$ is greater than or equal to $WSI_{e\_ip}$.

The invention also relates to an apparatus for managing irrigation using the above-described process. The device includes:
- a) one or more infrared thermometers effective for measuring plant canopy temperature in two or more of the target control areas and at least one reference area;
- b) a microprocessor for recording plant canopy temperature measurements, and calculating therefrom the diel progression of the plant canopy temperature change and a cumulative water stress index for each of the control areas, wherein the microprocessor is further effective for comparing the water stress index to a threshold water stress index value; and
- c) a register operatively connected to the microprocessor effective for accumulating units of water stress index into an integrated WSI for each control area in response to the microprocessor;

wherein the microprocessor is also effective for comparing the accumulated units of water stress index (integrated WSI) in the register to a set-point value.

In accordance with this discovery, it is an object of this invention to provide an improved method and apparatus for managing irrigation of plants.

Another object of the invention is to provide a method and apparatus for managing irrigation of plants to minimize or alleviate plant water-deficit stress and maximize crop production and/or maximize water use efficiency.

Yet another object of the invention is to provide a method and apparatus for managing irrigation of plants based upon a plant and region specific threshold water stress index.

A further object of this invention is to provide a method and apparatus for managing irrigation of plants incorporating process set-points which can be manipulated to provide a regulated water-deficit irrigation that provides for increased water use efficiency while reducing the risk of crop yield failure commonly associated with other methods of deficit irrigation.

Other objects and advantages of the invention will become apparent from the ensuing description.

BRIEF DESCRIPTION OF THE DRAWINGS

FIG. 1 shows an example of one embodiment of a layout of control areas, in this example for a center pivot irrigated field showing 144 target control areas or management zones. Infrared thermometers (IRTs) are mounted on the pivot lateral, viewing each zone forward of the irrigation system. Control zones are outlined in black. The pivot lateral is represented by a dashed line. The view is nadir from above the field.

DETAILED DESCRIPTION OF THE INVENTION

The process and apparatus of this invention may be used for managing irrigation or watering of a variety of plants, particularly agronomically important field crops, vegetables, fruits and fruit trees, turf grass, golf courses, urban landscapes and horticultural crops. Without being limited thereto, examples of plants which may be managed using this invention include sorghum, cotton, corn, wheat, beans, soybeans, peppers, cucumbers, tomatoes, potatoes, peach trees, orange trees, pecan trees, olive trees, roses and petunias. It is also envisioned that the invention may be used in a variety of climates, with any production system or any type of irrigation system, including stationary irrigation systems and particularly field traversing irrigation systems such as a center pivot system. In addition to its application in arid and semi-arid regions, the invention may be used in non-arid or humid regions to identify the need for supplemental irrigation, or even for managing watering in greenhouses. Irrigation systems of particular interest which may be used with this invention include, but are not limited to, drip, sprinkler, LEPA [low energy precision application, as described by Lyle and Bordovsky (1981, Trans ASAE, 24:1241-1245), and Bordovsky and Lyle (1988, ASAE Paper no. 88-2097, ASAE, St. Joseph, Mich.), the contents of each of which are incorporated by reference herein], and flood irrigation.

Determination of a plant's need for water in accordance with this invention is based upon a cumulative water stress index (WSI) and an integrated WSI set-point. Without being limited thereto, a detailed, step-by-step description of the preferred irrigation scheduling process of this invention is as follows:

a. The sensors operate continuously from positions on the moving irrigation system lateral or dispersed at stationary locations in the field to be irrigated such that they sense the desired control areas.

b. A computer running supervisory control and data acquisition (SCADA) software (typically, but not necessarily, installed at the location of the irrigation system control panel) gathers data from the sensors at a suitable time interval (typically <=5 min) using wireless or wired data transmission.

c. From the surface temperature data, the mean temperature ($T_{rmt}$, ° C.) of the control area for the time period, τ, is determined. The time period τ is typically the time for the sensor to move across the target control area for sensors mounted on moving irrigation systems, and thus may vary with the selected size of the area and speed of the system.

d. Canopy temperatures are measured continuously at one or more reference locations and the mean values reported at the same time interval as in step (b) in order to determine a diel series of reference canopy temperature ($T_{ref}$) values throughout the day (24-h from midnight to midnight). At the end of daylight each day, there is a value of $T_{ref}$ for each time period during the day. Alternatively, the diel series of reference surface temperature $T_{ref}$ may be evaluated iteratively (e.g., Evett et al. 2010. Single- and dual-surface implicit energy balance solutions for reference ET. Proc. 5th Decennial National Irrigation Conf., 5-8 Dec. 2010, Phoenix, Ariz. Paper No. IRR10-8347. ASABE, St. Joseph, Mich., the contents of which are incorporated by reference herein) from the equations describing the single-surface or big leaf energy balance $$0 = ET_{r1} + R_n + G + H \quad [1]$$

where $ET_{r1}$ is the evapotranspiration, $R_n$ is net radiation and G is soil heat flux and both are taken as positive towards the surface; and H is the sensible heat flux (all in W m$^{-2}$), which is computed by $$H = \frac{\rho_a c_p (T_a - T_{ref\_e})}{r_{aH}} \quad [2]$$

where $r_{aH}$ is the aerodynamic resistance to sensible heat flux, $T_a$ is the air temperature, and $T_{ref\_e}$ is the estimated surface temperature which value is to be determined as described below and used as the estimated value of $T_{ref}$ in the determination of the diel progression of temperatures. Net radiation, $R_n$, is calculated as $$R_n = (1-\alpha)R_s - \sigma\epsilon(T_{ref\_e} + 273.2)^4 + R_L \quad [3]$$

where $R_s$ is solar irradiance at the surface, α is the albedo or surface reflectance (typically 0.23 but can be user chosen for specific crops), ε is the surface emissivity (typically 0.96 but can be user chosen for specific crops), σ is the Stefan-Boltzmann constant (5.67×10$^{-8}$ W m$^{-2}$ K$^4$), $T_{ref\_e}$ is the estimated $T_{ref}$ surface temperature (° C.), and the down-welling long wave radiation is $$R_L = \sigma(T_a + 273.2)^4 \epsilon_a \quad [4]$$

where $\epsilon_a$ is the sky emissivity and is calculated per Idso (1981. ibid) as $$\epsilon_a = 0.70 + 5.95 \times 10^{-4} e_a \, \exp\left[\frac{1500}{T_a + 273.1}\right] \quad [5]$$

The evapotranspiration, $ET_{r1}$, is computed using a rate equation as $$ET_{r1} = \lambda(e_s - e_a)/(r_{av} + r_c) \quad [6]$$

where λ is the latent heat of evaporation (λ=2.501−2.370× 10$^{-3}$ $T_{ref\_e}$, $T_{ref\_e}$ in ° C. and λ in J kg$^{-1}$×10$^6$) $r_{av} = r_a$, $r_c$ is the canopy resistance, and the substomatal vapor pressure, $e_s$ (kPa), is computed from the surface temperature, $T_{ref\_e}$ (° C.), using (Murray, F. W. 1967. On the computation of saturation vapor pressure, J. Appl. Meteorol., 6, 203-204.)

$$e_s = 0.61078 \exp\left(\frac{17.269 T_{ref\_e}}{237.3 + T_{ref\_e}}\right) \quad [7]$$

and, $e_a$ is the vapor pressure of the air at reference height calculated from the dew point temperature, $T_{dew}$, as $$e_a = 0.61078 \exp\left(\frac{17.269 T_{dew}}{237.3 + T_{dew}}\right) \quad [8]$$

or from the relative humidity (RH, %) as $e_a = e_s(RH/100)$. Since the surface temperature is used in the calculation of $ET_{r1}$, $R_n$ and H, the surface energy balance (Eq. [1]) is implicit in the surface temperature, $T_{ref\_e}$, and must be solved using an implicit equation solver. Examples of implicit solution for surface temperature are given by Lascano et al. (2010. A field test of recursive calculation of crop evapotranspiration. Trans. ASABE. 53(4):1117-1126) and by Evett et al. (2010. ibid).

e. For sensors mounted on a moving irrigation system, the scaling procedure described by Peters and Evett (2004. Modeling diurnal canopy temperature dynamics using one-time-of-day measurements and a reference temperature curve. Agron. J. 96(6): 1553-1561) is used to determine the diel progression of surface temperature change for each control area (management zone) using:

$$T_s = T_e + \frac{(T_{rmt,t} - T_e)(T_{ref} - T_e)}{T_{ref,t} - T_e} \quad [9]$$

for every measurement interval, where $T_e$ (° C.) is the predawn canopy temperature; $T_{ref}$(° C.) is the reference canopy temperature at the same time interval as $T_s$ (° C.); $T_{rmt,t}$ is the one-time-of-day canopy temperature measurement of the control area (remote location, denoted by subscript rmt) at any daylight time t measured by the temperature sensors on the moving system; and $T_{ref,t}$ (° C.) is the measured reference temperature for the same time t that the plot (remote) temperature measurement ($T_{rmt,t}$) is taken. Calculation of the diel progression of temperatures, $T_s$, for each time interval in the day (daylight hours only) corresponding to each control area is achieved by successive application of Eq. [9] at each time interval using the site-specific values of $T_{ref,t}$; the value of $T_e$ may be taken as the minimum pre-dawn mean periodic value of $T_{ref}$ for the day.

f. From the air temperature, an estimate of the dry baseline temperature ($T_{dry}$, °C.) for the period is made using, for example, $$T_{dry} = T_{max} + 5 \quad [10]$$

where $T_{max}$ (° C.) is the maximum daily dry bulb temperature. Other approaches for calculating $T_{dry}$ are possible, including those in which evapotranspiration is set to zero and the energy balance (Eq. [1]) is solved iteratively for surface temperature (e.g., Evett et al. 2010. ibid).

g. From the weather data (air temperature, relative humidity, wind speed and solar irradiance), a value of wet reference surface temperature ($T_w$) (a substitute for the well-watered base line temperature of Idso et al. (1981. Normalizing the stress-degree parameter for environmental variability. Agric. Meteorology. 24:45-55) for the period is calculated using an energy balance equation. One method of calculation is direct $$T_w \approx T_a - \frac{e_s(T_{dry}) - e_a}{\Delta + \gamma} \quad [11]$$

where $T_a$ is the air temperature, $T_{dry}$ is the maximum daily dry-bulb temperature ($T_{max}$, ° C.)+5° C., $e_s$ is saturated vapor pressure (Pa) at $T_a$, $e_a$ is actual vapor pressure (Pa), $\Delta$ is the slope (Pa ° C.$^{-1}$) of the saturated vapor pressure versus temperature curve evaluated at $T_a$, and $\gamma$ is the psychrometric constant (Pa ° C.$^{-1}$), all evaluated for the measurement period. Alternatively, $T_w$ is evaluated by iterative solution of Eq. [1] (e.g., Evett et al. 2010. ibid) using $\alpha=0.23$ for reference alfalfa conditions, and $\epsilon=0.96$ for reference alfalfa.

h. An empirical water stress index value ($WSI_{e\_p}$) for the period is calculated using one of two alternative methods, although more alternatives are possible depending on assumptions. One method uses the temperatures evaluated in steps (c), (d), (e), (f) and (g) above:

$$WSI_{e\_p} = \frac{T_s - T_w}{T_{dry} - T_w} \quad [12]$$

The other method follows the approach of Jackson et al. (1988. ibid) in which a more theoretical WSI, $WSI_{t\_p}$, is responsive to solar irradiance and wind speed:

$$WSI_{t\_p} = \frac{(T_s - T_a) - (T_s - T_a)_{LL}}{(T_s - T_a)_{UL} - (T_s - T_a)_{LL}} \quad [13]$$

where the upper limit of $(T_s-T_a)$, $(T_s-T_a)_{UL}$, is found for the case in which canopy resistance approaches infinity as:

$$(T_s - T_a)_{UL} = \frac{r_a I_{cu} R_n}{\rho c_p} \quad [14]$$

where $I_{CU}=0.9$ and reduces the available energy from $R_n$ in proportion to that partitioned to soil heat flux; and the lower limit of $(T_s-T_a)$, $(T_s-T_a)_{LL}$, is found from:

$$(T_s - T_a)_{LL} = \frac{r_a I_{cl} R_n}{\rho c_p} \frac{\gamma}{\Delta + \gamma} - \frac{e_s - e_a}{\Delta + \gamma} \quad [15]$$

The value of $\gamma$ in Eq. [15] can be replaced by $\gamma^* = \gamma(1 + r_{cw}/r_a)$ where $r_{cw}$ is the canopy resistance of a well-watered crop. This allows adjustment for species- or cultivar-specific variations in the canopy resistance, $r_c$.

i. The value of $WSI_{e\_p}$ or $WSI_{t\_p}$ is compared to an encoded threshold water stress index value ($WSI_{e\_psp}$) and if $WSI_{e\_p} >= WSI_{e\_psp}$ or $WSI_{t\_p} >= WSI_{e\_psp}$ for the time period, then a unit of integrated WSI ($WSI_{e\_i}$) is accumulated. Note that the $WSI_{e\_i}$ is set to zero each midnight and values of $WSI_{e\_i}$ are not accumulated during nighttime. The $WSI_{ei}$ is then compared to an encoded set-point value for a 24-h period ($WSI_{e\_ip}$). For any day in which the $WSI_{e\_i} >= WSI_{e\_ip}$, a signal to irrigate is triggered for the respective control area. Determination of $WSI_{e\_psp}$ and $WSI_{e\_ip}$ encoded values is described below. The accumulated value of $WSI_{e\_i}$ may be either the number of minutes in the period, $\tau$, (time based integrated WSI) or the value of either $\tau(WSI_{e\_p} - WSI_{e\_psp})$ or $\tau(WSI_{t\_p} - WSE_{e\_psp})$ in which case the accumulation of integrated WSI is scaled by the degree of stress.

Actual irrigation depths are based on knowledge of the peak daily water use (ETpeak) for a growing season and crop and the time required for the irrigation system to complete one irrigation over all control areas (typically 1 to 3 days), called the return interval (Tr), and may be determined by the grower. For example, if the return interval is one day then the irrigation application depth is equal to ETpeak; if the return interval is 1<Tr<=2, then the application depth is 2×ETpeak; if the return interval is 2<Tr<=3, then the application depth is 3×ETpeak, etc.

The encoded set-point values described above may be determined as follows:

a. The value of $WSI_{e\_psp}$ is a species- and cultivar-specific value between zero and unity (e.g., 0.45), where zero represents no stress and unity represents complete stress. This user-chosen value allows setting of a regulated degree of deficit irrigation.

b. For a well-watered crop of given species and season length, the values of $WSI_{e\_i}$ are determined for every day during the irrigation season using the methods described above. The mean of $WSI_{e\_i}$ values over the irrigation season (e.g., from one or more preceding seasons) is taken as the value of the encoded set-point value for a 24-h period, $WSI_{e\_ip}$.

c. In determinations of $WSI_{e\_i}$, use of data from multiple years is encouraged in order to average out the effects of inter-annual variability in weather and crop. Use of multiple-year yield, WSI and water use data are encouraged in order to build reliable relationships between values of $WSI_{e\_psp}$ and the crop production function (yield as a function of water use) and the water use efficiency function (WUE versus $WSI_{e\_psp}$).

As noted above, the process thresholds and set-points can be manipulated to provide a regulated water-deficit irrigation that provides for increased water use efficiency while reducing the risk of crop yield failure commonly associated with other methods of deficit irrigation. For the purposes of this invention, water use efficiency is defined as the units of economic yield achieved per unit of crop water use for a control area. The crop water use is defined as the evapotranspiration plus any water moving irrecoverably downward in the soil past the root zone either intentionally (e.g., for purposes of leaching salts downward through the soil and out of the root zone) or unintentionally (e.g., deep percolation losses due to excessive irrigation), plus any net water lost to runoff.

The set-point to be manipulated can be either the $WSI_{e\_psp}$ or the integrated WSI set point ($WSI_{e\_ip}$). Reducing either value will increase irrigation and increasing it will reduce irrigation. Because the irrigation control loop is in feedback with the crop condition as sensed by the infrared thermometers, the crop condition is controlled to a particular stress level such that the reduction in irrigation (deficit irrigation) is well regulated and crop yield, while possibly diminished, is not put at excessive risk.

The apparatus of the invention includes sensors for measuring the canopy temperature of plants within the target control areas communicating with a control unit for determining if the plant is stressed and if irrigation is necessary. In a preferred embodiment, the sensors are part of a wireless sensor network including a wireless GPS module, and are in wireless communication with a site-specific weather station providing air temperature, relative humidity, wind speed, solar irradiance and precipitation. Measurements of canopy temperatures are made using a conventional infrared thermometer (IRT), sensitive to infrared radiation in the thermal range, between about 8 to 14 μm. Without being limited thereto, the IRT should have a field of view, e.g., about 15°, to provide a spot size that includes a portion of the canopies of several plants but does not extend above the horizon and does not extend downward so as to include appreciable soil surface in the spot when mounted above the surface and aimed at a downward angle (about 45° from horizontal), and should allow correction for ambient temperature conditions. In a preferred embodiment, two such sensors are aimed at the control area from nearly opposite sides of the area in order to reduce sun angle effects on measured surface temperature. Suitable infrared thermometers are described, for example, by Wood and Scharf (U.S. Pat. No. 4,998,826) the contents of which are incorporated by reference herein. Additional, optional sensors may be included for measuring one or more of air temperature, relative humidity, wind speed, precipitation and solar irradiance if communication with a weather station is not provided.

A microprocessor based computer control unit having conventional interface hardware is provided for receiving and interpreting the signals from the sensors. The microprocessor includes first hardware and/or software means for recording plant canopy temperature measurements, and calculating therefrom the diel progression of the plant canopy temperature change, and cumulative water stress index, WSI, for each of the control areas in accordance with the algorithm described above. The microprocessor also compares each WSI to a threshold water stress index value, $WSI_{e\_psp}$. A storage register is also provided which is in communication with the microprocessor components, which is effective for accumulating and storing units or increments of water stress index, in response to a determination by the microprocessor that the WSI is greater than the $WSI_{e\_psp}$, into an integrated WSI for each control area. Suitable time storage registers include but are not limited to electronic or microprocessor memory. The microprocessor then compares the integrated WSI for each control area to a set-point value, $WSI_{e\_ip}$, to determine if the plants in each area are stressed. At least one signal generator may be provided in communication with the microprocessor, which is effective for generating and displaying an irrigation signal when the integrated WSI has exceeded the $WSI_{e\_ip}$. Signals may include audible alarms, visible beacons, lights or LEDs, printouts or any combination thereof.

Power for the apparatus may be provided using any conventional sources, including generators, wind generators, batteries, and AC electrical connections. When applied to moving irrigation systems, AC electricity is the preferred power source. Batteries are the preferred power source for wireless sensor units, and may include an optional solar recharging system.

The apparatus may be constructed as specific for a particular plant of interest, having values for the $WSI_{e\_psp}$ and $WSI_{e\_ip}$, and all necessary software permanently installed into the microprocessor. However, in the preferred embodiment, the microprocessor may be constructed with input means such as a wireless communication modem, plant selector module or manually operated keyboard, for entering the values of the appropriate $WSI_{e\_psp}$ and $WSI_{e\_ip}$, to increase flexibility and allow use with any plant in any geographical area. It is envisioned that a plurality of plant selector modules may be used, each specific for a particular plant and geographical area of interest. Signal reset means, such as a switch or circuit responsive to instructions through a keyboard, may also be provided to inactivate and reset the signal generators.

Although irrigation may be manually actuated by the producer in response to the above-mentioned signals, the apparatus may include optional control means for automatically actuating irrigation. Suitable control means should include appropriate electronic circuitry effective for actuating the particular irrigation device in response to the microprocessor. In accordance with this embodiment, automatic control means may replace or be used in conjunction with the signal generator.

The applications of the data measured and stored by the irrigation control process of the invention is not limited to irrigation control, but may also include the mapping of crop water stress levels and relative potential yields. With sensors mounted on either moving irrigation systems or in fixed locations in a field, data are stored for every sensing interval and can be used to develop maps of the raw data values or of derived quantities, some of which are related to relative crop water status and yield. Mapping is possible because GPS positioning allows the recording of the physical position of every measurement. Semivariance analysis and kriging, including cokriging, may be and have been used to develop continuous spatially distributed estimates of quantity values over a field.

In a preferred embodiment, surface temperature data are qualified for the presence of soil background in the field of view of the sensors. This is enabled by multi-band surface irradiance measurements processed to identify vegetation and soil indices.

In another preferred embodiment, data from soil water content sensors, soil water potential sensors and/or soil bulk electrical conductivity sensors are used as a check of crop water status and are used to qualify the irrigation initiation decision or to trigger cessation of irrigation.

In addition, both $WSI_{e\_p}$ (or $WSI_{t\_p}$) and the well correlated leaf water potential (LWP), are well correlated with yield as the growing season progresses. In the process of irrigation control, the $WSI_{e\_p}$ (or $WSI_{t\_p}$) data for each control area are accumulated and mean values computed for every day for which data were available relevant to the control area. Maps of potential yield may be developed from these data using relationships between mean seasonal $WSI_{e\_p}$ (or $WSI_{t\_p}$) and yield for the specific crop and region. Statistical process control may also be used to detect and map control areas in the field that vary by more than a set point value from trends established for the ensemble data over time (e.g., Peters and Evett. 2007. Spatial and temporal analysis of crop stress using multiple canopy temperature maps created with an array of center-pivot-mounted infrared thermometers. Transactions of the ASABE. 50(3):919-927). Maps thus created may be used directly to alert the grower or irrigation system operator to potential problems with the irrigation system or crop, and may be used to add robustness to automated interpretations made using other data.

It is understood that the foregoing detailed description is given merely by way of illustration and that modifications and variations may be made therein without departing from the spirit and scope of the invention.

We claim:

1. A method for managing the irrigation of plants comprising:
    a) mapping a geographical area subject to irrigation into two or more target control areas;
    b) determining a diel progression of a plant canopy temperature change, $T_s$, for each of said control areas comprising:
        1) measuring and recording a predawn canopy temperature, $T_e$, of plants in the vicinity of said control areas;
        2) measuring and recording a mean canopy temperature, $T_{rmt,t}$, of plants in each of said control areas over a time interval, $\tau$, during a daylight time, $t+n\tau$, where n is an integer greater than or equal to 0;
        3) measuring and recording over each said time interval, $\tau$, during the course of a day, a mean reference canopy temperature, $T_{ref}$, for plants of the same species grown under well-watered conditions in a reference area in the vicinity of said geographical area wherein the value of $T_{ref}$ which is measured coincident with the time as said $T_{rmt,t}$ for any control area is measured, is $T_{ref,t}$; and
        4) determining the diel progression of the canopy temperature change, $T_s$, for each of said control areas at each said time, $t+n\tau$;
    c) determining a water stress index value, WSI, for each of said control areas at each said time, $t+n\tau$;
    d) comparing each of said WSI values for each of said control areas to a threshold water stress index value, $WSI_{e\_psp}$, wherein said $WSI_{e\_psp}$ is specific for said plant in said geographic area, and
        1) for each of said WSI which is greater than or equal to said $WSI_{e\_psp}$, adding a unit to a WSI register to provide an integrated WSI, $WSI_{e\_i}$ or $WSI_{e\_t}$, for each said control area;
    e) comparing said $WSI_{e\_i}$ or $WSI_{e\_t}$ for each of said control areas to an encoded set-point value, $WSI_{e\_ip}$, for a predetermined time period, and generating an irrigation signal for irrigation, or automatically initiating irrigation, of any control area wherein said integrated WSI is greater than or equal to said $WSI_{e\_ip}$.

2. The method of claim 1 wherein said diel progression of the canopy temperature change is determined by:

$$T_s = T_e + \frac{(T_{rmt,t} - T_e)(T_{ref} - T_e)}{T_{ref,t} - T_e}.$$

3. The method of claim 1 wherein said predetermined time period for said $WSI_{e\_ip}$ is approximately 24 hours.

4. The method of claim 1 wherein said $T_e$ comprises the minimum pre-dawn measured value of $T_{ref}$ for said day.

5. The method of claim 1 wherein said $T_e$ is the mean reference canopy temperature measured over the last pre-dawn period $\tau$.

6. The method as described in claim 1 wherein said plant is selected from the group consisting of field crops, vegetables, fruits and fruit trees, turf grass, golf courses, urban landscapes and horticultural crops.

7. The method of claim 1 wherein said $T_e$, $T_{rmt,t}$ and $T_{ref}$ are measured using an infrared thermometer.

8. The method of claim 1 further comprising repeating steps a) through e) on two or more consecutive days.

9. The method of claim 1 wherein said irrigation is provided using a controllable irrigation system.

10. The method of claim 1 wherein said irrigation is provided using a field-traversing irrigation system.

11. The method of claim 1 wherein said irrigation is automatically actuated for any control area wherein said integrated WSI is greater than or equal to said $WSI_{e\_ip}$.

12. The method of claim 1 wherein said irrigation signal is an audible or visible signal.

13. An apparatus for managing irrigation of plants comprising:
    a) one or more infrared thermometers effective for measuring plant canopy temperature in two or more target control areas and at least one reference area;
    b) a microprocessor for recording plant canopy temperature measurements, and calculating therefrom the diel progression of the plant canopy temperature change and a cumulative water stress index for each of said control areas, wherein said microprocessor is further effective for comparing said water stress index to a threshold water stress index value; and
    c) a register operatively connected to said microprocessor effective for accumulating units of water stress index in response to said microprocessor;
wherein said microprocessor is also effective for comparing the accumulated units of water stress index in said register to a set-point value.

14. The apparatus of claim 13 further comprising a signal generator operatively connected to said microprocessor, effective for displaying an irrigation signal when the accumulated units of water stress index in said register is greater than or equal to said set-point value, wherein said irrigation signal is displayed by said signal generator for an operator to review and manually activate irrigation.

15. The apparatus of claim 13 further comprising a signal generator operatively connected to said microprocessor, effective for displaying an irrigation signal when the accumulated units of water stress index in said register is greater than or equal to said set-point value, wherein said irrigation signal is transmitted by said signal generator to an irrigation system for automatically activating irrigation.

16. The apparatus of claim 13 further comprising an irrigation system operatively connected to said signal generator.

17. The apparatus of claim 13 further comprising input means for designating said threshold water stress index value and said set-point value to said microprocessor.

18. A method for managing the irrigation of plants comprising:
    a) mapping a geographical area subject to irrigation into two or more target control areas;
    b) determining a diel progression of a plant canopy temperature change, $T_s$, for each of said control areas comprising:
        1) measuring and recording the mean canopy temperature, $T_{rmt,t}$, of plants in each of said control areas over a time interval, $\tau$, during a daylight time, $t+n\tau$, where n is an integer greater than or equal to 0;
        2) estimating a diel series of surface temperature of well-watered plants, $T_{ref}$, using an iterative solution of the energy balance equations with a species-specific canopy resistance value at each said time, $t+n\tau$; and 3) estimating the diel progression of surface temperature of each said control area at each said time, t+nτ;

c) determining a water stress index value, WSI, for each of said control areas at each said time, t+nτ;

d) comparing each of said WSI values for each of said control areas to a threshold water stress index value, $WSI_{e\_psp}$, wherein said $WSI_{e\_psp}$, is specific for said plant in said geographic area, and 1) for each of said WSI which is greater than or equal to said $WSI_{e\_psp}$, adding a unit to a WSI register to provide an integrated WSI, $WSI_{e\_i}$ or $WSI_{e\_t}$, for each said control area;

e) comparing said $WSI_{e\_i}$ or $WSI_{e\_t}$ for each of said control areas to an encoded set-point value, $WSI_{e\_ip}$, for a predetermined time period, and generating an irrigation signal for irrigation, or automatically initiating irrigation, of any control area wherein said integrated WSI is greater than or equal to said $WSI_{e\_ip}$.

19. The method of claim 18 wherein said diel progression of the surface temperature is determined by:

$$T_s = T_e + \frac{(T_{rmt,t} - T_e)(T_{ref} - T_e)}{T_{ref,t} - T_e}.$$

* * * * *